United States Patent [19]

Molenaar et al.

[11] 3,937,134
[45] *Feb. 10, 1976

[54] COFFEE FILTERING

[75] Inventors: Albert Meijlom Molenaar, Terkaple; Melle Veenstra, Appelhoflaan, Joure, both of Netherlands

[73] Assignee: Douwe Egberts Tabaksfabriek-Koffiebranderijen-Theehandel B.V., Utrecht, Netherlands

[ * ] Notice: The portion of the term of this patent subsequent to Apr. 2, 1991, has been disclaimed.

[22] Filed: Jan. 11, 1974

[21] Appl. No.: 432,522

Related U.S. Application Data

[63] Continuation-in-part of Ser. No. 208,098, Dec. 15, 1971, Pat. No. 3,800,690.

[52] U.S. Cl. .................... 99/295; 99/306; 426/77; 426/82; 426/433
[51] Int. Cl.² .................... A47J 31/02; A47J 31/10
[58] Field of Search ................ 426/77, 82, 79, 433; 99/295, 306, 316, 322, 323

[56] References Cited
UNITED STATES PATENTS

| 3,083,101 | 3/1963 | Noury | 99/295 |
| 3,800,690 | 4/1974 | Molenear et al. | 99/306 |

FOREIGN PATENTS OR APPLICATIONS

| 1,080,222 | 12/1954 | France | 99/306 |
| 1,214,364 | 10/1958 | France | 426/77 |

Primary Examiner—Tim R. Miles
Assistant Examiner—Neil F. Greenblum
Attorney, Agent, or Firm—Baldwin, Egan, Walling & Fetzer

[57] ABSTRACT

A coffee filter for a single percolation having an extraction chamber including a support for supporting a pressed coffee tablet, and locating an underlying filter, a predetermined distance range from the bottom of the coffee tablet.

3 Claims, 6 Drawing Figures

COFFEE FILTERING

This application is a continuation-in-part of U.S. Ser. No. 208,098, filed Dec. 15, 1971 now U.S. Pat. No. 3,800,690 issued Apr. 2, 1974 in the names of Albert Meijlom Molenaar and Melle Veenstra and entitled "Coffee Filtering".

This invention relates to an apparatus for making coffee by once-through percolation of preheated water, comprising a reservoir adapted to receive water, an extraction chamber adapted to receive a ground coffee tablet which will expand or swell when percolated, a perforated wall which separates the reservoir from the extraction chamber in such a way that, when the apparatus is in the position for use, the water flows or trickles from the first-mentioned to the last-mentioned compartment through gravity, and the extraction chamber furthermore comprises a support for a filter, which leaves the greater part of the filter surface clear.

It is an object of the present invention to improve on the apparatus as disclosed in Belgian patent 646,822 (MIKO) so that a higher extraction yield is obtained, and an even thickness of the bed of coffee, in which the coffee, prior to the use thereof, has better flavor-keeping characteristics.

To that end the apparatus according to the invention is characterized in that the extraction chamber comprises a continuous annular collar for supporting a pressed tablet of roasted and ground coffee so that the bottom of the coffee tablet is located at some distance from and approximately parallel to the filter. Thus it is attained that when the water is poured onto the tablet, it cannot simply flow along the tablet, but it can moisten the bottom thereof due to capillary action. As the result of this action the tablet disintegrates evenly and a homogenous bed is formed before the water percolates.

In connection with the distance between the bottom of the coffee tablet and the filter it is noted that this depends on the diameter and the thickness of the coffee tablet used and furthermore on the ground coffee used for the tablets, i.e. grain size and pressing conditions. Generally it can be said that said distance ranges from 0.5 to 4 mm.

Some embodiments of the invention will now be described by way of example with reference to the accompanying drawings. In the drawings.

Figure 1:
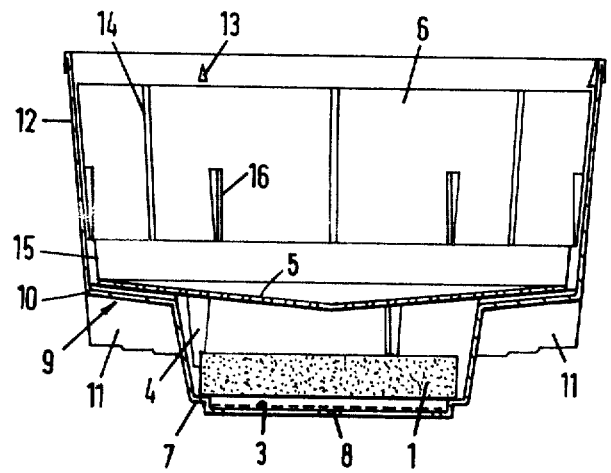
FIG. 1 is a vertical cross-section of a coffee filter with a water reservoir according to the invention.
Figure 3:
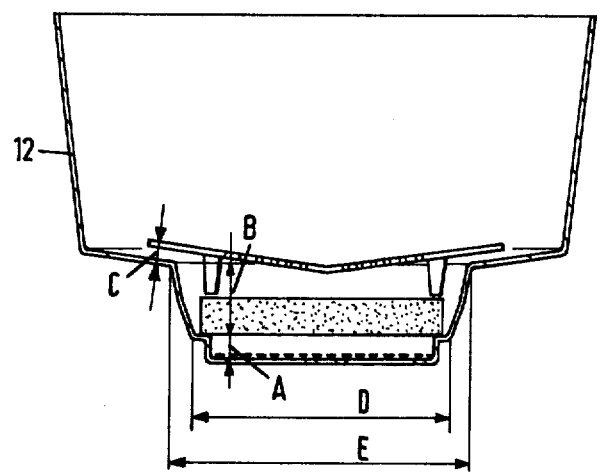
Figure 4:
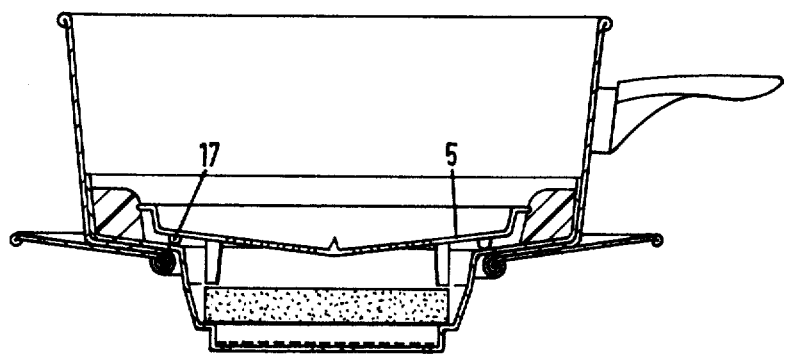
Figure 5:
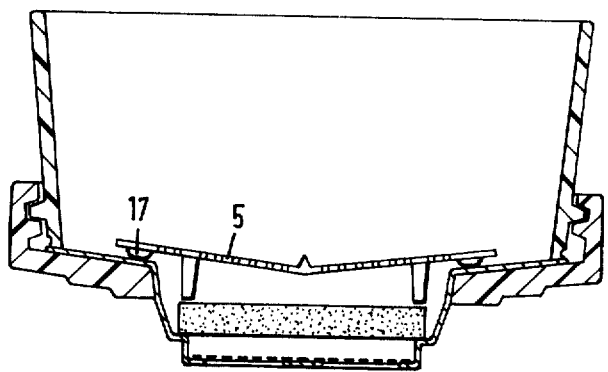

FIG. 3 schematically shows a filter and a plurality of basic dimensions therein for a one-cup filter;

FIG. 4 shows a cross-section as in FIG. 1 of a second embodiment;

FIG. 5 shows a cross-section as in FIG. 1 of a third embodiment; and

Figure 6:
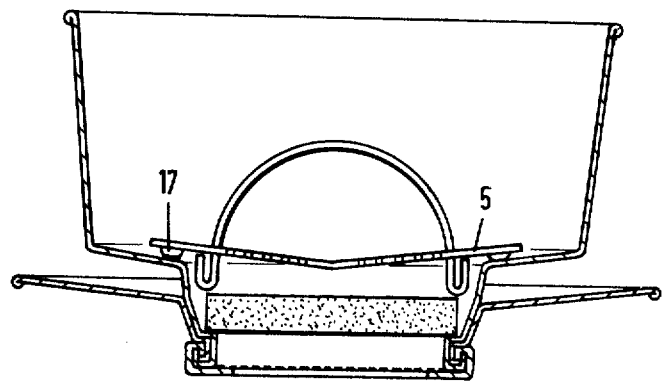

FIG. 6 shows a cross-section as in FIG. 1 of a fourth embodiment.

FIG. 1 shows a coffee tablet 1 received in a holder 2 (FIG. 2) for ground coffee, said holder being provided with a filter bottom 3 at its lower end.

Coffee tablet 1 is retained in holder 2 by lugs 4. Above the holder there is a grid 5 at the bottom of a water reservoir 6. Lugs 4 are also attached thereto.

Coffee tablet 1 has the shape of an, at least at the bottom, substantially flat disc and is supported along the lower edge on a continuous edge 7 in tablet holder 2. The lower face of the coffee tablet is spaced some distance from filter bottom 3, which bears on a bearing cross 8. Thus it is attained that the water can moisten the bottom of the tablet through capillary action so that the tablet disintegrates evenly before the water percolates.

The upper face of the tablet may be profiled for a better control of the moistening phase.

The tablet holder extends conically upwardly from the support edge 7, so that the tablet has at least 1-2 mm space on the top to expand radially. Contiguous to the wall of this extraction chamber there is on the top a slightly upwardly inclined wall 9 having five radially extending recesses 10. The wall 9 has on the lower side five wings 11 having a trapped configuration on the lower side for centering the coffee filter on a cup. The wall 9 extends into an upwardly diverging wall 12 with snapping lugs 13. The wall of the water reservoir 6 bears against the wall 12 and is retained by the lugs 13. In the wall of the water reservoir there are a number of vertical slots 14 extending to a trapped portion 15. The bottom of the water reservoir 6 with grid 5 is slightly conical in downward direction. Gases and vapors which cannot easily escape through the small holes in the grid 5 deflect laterally via the recesses 10, the space around the trapped portion 15 and the slots 14. A number of stacking lugs 16 are arranged on the inner wall of the water reservoir. As has been noted above, the coffee tablet obtained by pressing ground and roasted coffee has to be located at some distance from the filter bottom. It has been found that this distance depends on the diameter and thickness of the coffee tablet and on the composition, for instance, the grain size of the ground coffee used for pressing, and the conditions under which the coffee is pressed. In principle this distance may range from 0.5 – 4 mm.

In order to give some indications of the dimensions of the extraction chamber in a one-cup filter, a filter has been schematically shown in FIG. 3 and a number of indications as to size has been given.

A is situated between approximately 0.5 and 4 mm.
B is situated between approximately 12 and 15 mm.
C is situated between approximately 1 and 2 mm.
D is situated between approximately 40 and 46 mm.
E is situated between approximately 46 and 52 mm.

Figure 2:
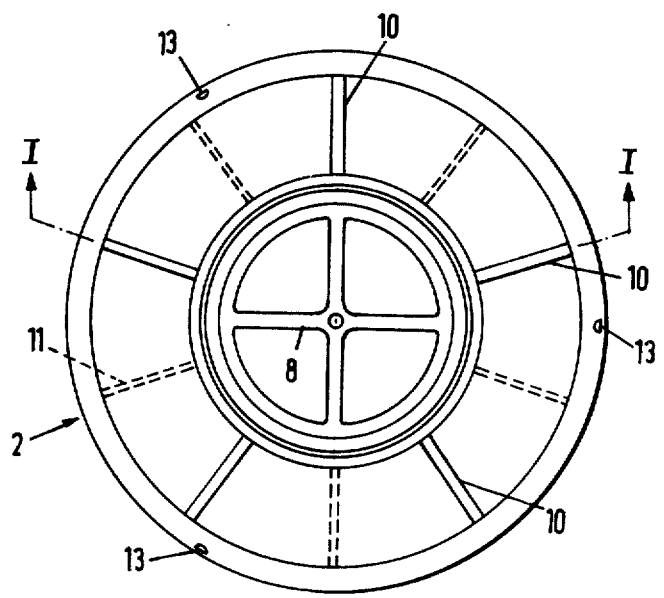
FIG. 2 is a top elevation of the holder shown in FIG. 1.

Contrary to the embodiment shown in FIGS. 1 and 2, for which polystyrene is used, the embodiments shown in FIGS. 4, 5 and 6 are not completely disposable.

In the embodiment shown in FIG. 4 a holder made of chromium-plated brass is used, comprising a handgrip made of bakelite. In this holder a disposable extraction chamber of polystyrene with a (pressed) tablet is accommodated. Grid 5, adapted to distribute the water has small lugs 17 at its bottom so that between the grid and the remaining portion of the extraction chamber, which portions are snapped together, a slot is formed through which gases and vapors can escape.

In the embodiment shown in FIG. 5, compared to the embodiment shown in FIG. 4, use has been made of a somewhat simplified disposable extraction chamber, also made of polystyrene. The outer edge thereof is clamped between portions of the holder which are interconnected by thread. In this embodiment grid 5 is connected with the remaining portion of the extraction chamber through lugs 17 by spot welding.

Finally FIG. 6 shows an embodiment without the disposal parts. The holder comprises a detachable grid 5. Therefore the extraction chamber can be cleaned after use and then a new tablet can be put therein.

As the grid, as well as the holder, is made of chromium-plated brass, no separate means are necessary for securing the grid to the remaining portion of the extraction chamber, as the grid is kept in its place by its weight. Furthermore, instead of a bearing cross and the disposable filter bottom bearing thereon, a non-rigid ring of plastic in which Monel-gas has been sealed, is used in this filter.

It is noted that the essence of the invention can also be applied in an embodiment, which may be manufactured at low costs, but which is less attractive for esthetic reasons. It is, for instance, possible to provide a pressed tablet between two filter papers in a plastic container made of one piece. The top filter serves to distribute the water. To provide the necessary space between the bottom filter and the tablet, a spacer is provided on the bottom filter, preferably a ring along the periphery or, if desired, a cross, which supports the tablet. Furthermore one has to see to it that there is some clearance between the tablet and the vertical wall so as to enable the tablet to expand radially.

What is claimed is:

1. An apparatus for making coffee by oncethrough percolation of preheated water, comprising a reservoir for receiving the water, an extraction chamber for ground coffee separated from said reservoir by a wall which is perforated in such a way that when the apparatus is used the water flows or trickles from said reservoir to said chamber through gravity, a coffee tablet disposed in said chamber, and furthermore the extraction chamber comprises a support for a filter, said support leaving the greater part of the filter surface clear, and wherein the extraction chamber comprises a continuous annular collar means for supporting said tablet of roasted and ground coffee thereon above said filter and so constructed and arranged that the bottom of the coffee tablet is approximately parallel to said filter and located at a distance within the range of approximately 0.5 to 4mm. from said filter, and including means for retaining the tablet against the said collar.

2. An apparatus in accordance with claim 1 wherein said retaining means comprises lugs depending from said perforated wall adapted for engagement with said tablet, said extraction chamber comprising interior side wall surfaces diverging in an upward direction commencing at the outer periphery of said collar, water from said reservoir being adapted to moisten the bottom of said tablet through capillary action, so that the tablet will disintegrate evenly before said percolation.

3. An apparatus in accordance with claim 2 including other lug means positioned between said perforated wall and said annular collar to space said perforated wall from said collar to provide a clearance for escape of gases and vapors from said chamber past said perforated wall.

* * * * *